United States Patent
Erdogmus et al.

(10) Patent No.: US 6,963,604 B2
(45) Date of Patent: Nov. 8, 2005

(54) BLIND EQUALIZERS USING PROBABILITY DENSITY MATCHING AND PARZEN WINDOWING

(75) Inventors: Deniz Erdogmus, Gainesville, FL (US); Marcelino Lazaro, Madrid (ES); Jose Carlos Principe, Gainesville, FL (US); Ignacio Santamaria, Cantabria (ES)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/814,448

(22) Filed: Mar. 31, 2004

(65) Prior Publication Data

US 2004/0252799 A1 Dec. 16, 2004

Related U.S. Application Data

(60) Provisional application No. 60/459,287, filed on Mar. 31, 2003.

(51) Int. Cl.$^7$ .............................. H03H 7/30; H03H 7/40; H03K 5/159
(52) U.S. Cl. ........................ 375/232; 375/230; 375/229; 708/322; 708/323
(58) Field of Search ............................... 375/229–234, 375/350, 346, 316; 708/322, 323

(56) References Cited

U.S. PATENT DOCUMENTS

| | | | | |
|---|---|---|---|---|
| 5,970,093 A | * | 10/1999 | de Lantremange | 375/234 |
| 6,115,433 A | * | 9/2000 | de Lantremange | 375/326 |
| 6,141,378 A | * | 10/2000 | d'Oreye de Lantremange | 375/232 |
| 6,671,339 B1 | * | 12/2003 | Ahn | 375/346 |
| 2002/0041637 A1 | * | 4/2002 | Smart et al. | 375/316 |
| 2003/0072363 A1 | * | 4/2003 | McDonald et al. | 375/232 |
| 2004/0005010 A1 | * | 1/2004 | He et al. | 375/260 |
| 2004/0190649 A1 | * | 9/2004 | Endres et al. | 375/326 |

* cited by examiner

*Primary Examiner*—Phuong Phu
(74) *Attorney, Agent, or Firm*—Akerman Senterfitt

(57) ABSTRACT

An iterative method of equalizing an input signal received over a digital communication channel can include (a) using a kernel density estimate where different values of a kernel size are indicative of either a blind or a decision-directed equalization mode, (b) processing a received signal using a blind equalization mode, and (c) evaluating, on a block or sample basis, an error measure based on a distance among a distribution of an equalizer output and a constellation. The method also can include (d) updating the kernel size based upon the error measure thereby facilitating automatic switching between the blind and decision-directed equalization modes, where the kernel size is initially set to a value indicative of the blind equalization mode. The method additionally can include (e) selectively applying blind equalization or decision-directed equalization to the input signal according to the updated kernel size for subsequent iterations of steps (c)–(e).

36 Claims, 3 Drawing Sheets

BLIND EQUALIZERS USING PROBABILITY DENSITY MATCHING AND PARZEN WINDOWING

CROSS REFERENCE TO RELATED APPLICATIONS

This application claims the benefit of U.S. Provisional Application No. 60/459,287, filed in the United States Patent and Trademark Office on Mar. 31, 2003, the entirety of which is incorporated herein by reference.

STATEMENT AS TO FEDERALLY SPONSORED RESEARCH

This invention was made with United States Government support under grant number ECS-9900394 awarded by the National Science Foundation. The United States Government has certain rights in the invention.

BACKGROUND

1. Field of the Invention

The present invention relates to the field of communications and, more particularly, to equalization for digital communication channels.

2. Description of the Related Art

Channel equalization plays a key role in digital communication systems. Typically, the physical channel introduces a distortion to the transmitted signal that can make it difficult to recover the original data. An equalizer can reduce, or ideally completely eliminate, the introduced intersymbol interference (ISI). Conventional equalization techniques rely on the transmission of a reference, or training, sequence that is known at the equalizer. This sequence allows adaptation of the equalizer parameters to minimize some cost function that measures the distance between the actual equalizer output and the desired reference signal. For instance, when the equalizer is implemented by means of a linear filter, the filter coefficients can be adapted using least mean squares analysis to minimize the expectation of the squared error. This type of equalization is referred to as supervised equalization.

When a training or reference sequence is not available at the receiver, blind equalization can be used. Without a reference sequence, the only knowledge about the transmitted sequence is limited to its probabilistic or statistical properties. Under this constraint, blind equalization typically minimizes a cost function that is able to indirectly extract the higher order statistics of the signal or the current level of ISI at the equalizer output. Typically, the cost function is minimized by means of a stochastic gradient algorithm. Examples of this kind of algorithm can include the Sato algorithm as disclosed in Y. Sato, "A method of self-recovering equalization for multilevel amplitude modulation," IEEE Transactions on Communications, vol. COM-23, pp. 679–682 (1975); and the Godard algorithms as disclosed in D. N. Godard, "Self-recovering equalization and carrier tracking in two dimensional data communication systems," IEEE Transactions on Communications, vol. 28, pp. 1867–1875, (November 1980).

One significant disadvantage of blind equalization techniques such as those noted herein is their need for a high number of data symbols to achieve convergence to a good solution. The high number of data symbols is necessary because the criterion for optimization is unable to exploit the high order statistics present in the data. Following an initial approximate equalization stage, which could be either supervised or blind, typically decision-directed equalization is employed. Decision-directed equalization utilizes discretized versions of the equalizer outputs as desired reference signal values. The discretization is typically done by approximating the current value of the output with the nearest value from the symbol alphabet called the symbol constellation.

Other techniques attempt to improve the convergence speed of conventional blind equalizers and utilize higher order statistics. For example, Renyi's entropy, as disclosed in I. Santamaria, et al., "A fast algorithm for adaptive blind equalization using Renyi's entropy," in Proceedings of the International Conference on Acoustics, Speech, and Signal Processing, vol. III, Orlando, Fla., USA, 2002, pp. 2657–2660, has been used as a cost function for blind equalization of constant modulus signals. This approach is an application of information theoretic criteria to equalization and uses the Parzen window method (a nonparametric method) to estimate the underlying probability density function. A discussion of information theoretic criteria can be found in J. Principe, et al., "Learning from examples with information theoretic criteria," Journal of VLSI Signal Processing, vol. 26, pp. 61–77, 2000. Although this method can provide acceptable results for some communication channels, Renyi's entropy does not produce acceptable results for ill-conditioned channels, or those having zeros at or very close to the unit circle. Further, this technique is sensitive to noise.

What is needed is an equalization technique that is applicable to any symbol constellation standard and which provides improved performance over existing equalization techniques.

SUMMARY OF THE INVENTION

The inventive arrangements disclosed herein provide a method, system, and apparatus for a blind equalization technique for digital communication channels. The present invention can be applied to any symbol constellation used for digital communications, including, but not limited to, phase-shift-keying, quadrature amplitude modulation, or other types of discrete alphabets. In accordance with the inventive arrangements disclosed herein, the number of samples required to blindly identify the channel inverse for equalization can be reduced. As such, increased efficiency with respect to the use of transmission bandwidth in current digital communication systems where channel equalization is necessary can be achieved.

The present invention uses a novel cost function, or optimization criterion, based on the distance between an estimate of the probability density function (PDF) of the received symbols and of the constellation. The estimate of the PDF is obtained directly from the received symbol data using pairwise interactions among kernels centered on the received data. It should be appreciated that while Gaussian kernels have been used herein, any of a variety of kernel types can be used. Accordingly, Gaussian kernels have been used for purposes of illustration only and, as such, should not be construed as a limitation of the present invention.

The present invention also utilizes a kernel size parameter to facilitate a soft switching from a blind equalization mode to a decision-directed equalization mode. By automatically switching between the two modes, the present invention can attain improved equalization results without adding complexity over conventional equalization techniques.

One embodiment of the present invention can include an iterative method of equalizing an input signal received over a digital communication channel. The method can include (a) using a kernel density estimate where different values of the kernel size are indicative of either a blind or a decision-directed equalization mode, (b) processing a received signal using a blind equalization mode, and (c) evaluating, on a block or sample basis, an error measure based on the distance among a distribution of the equalizer output and a constellation. The method also can include (d) updating the kernel size based upon the error measure thereby facilitating automatic switching between the blind and decision-directed equalization modes, where the kernel size is initially set to a value indicative of the blind equalization mode. The method additionally can include (e) selectively applying blind equalization or decision-directed equalization to the input signal according to the updated kernel size for subsequent iterations of steps (c)–(e).

Other embodiments of the present invention can include a system having means for performing the various steps disclosed herein as well as a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
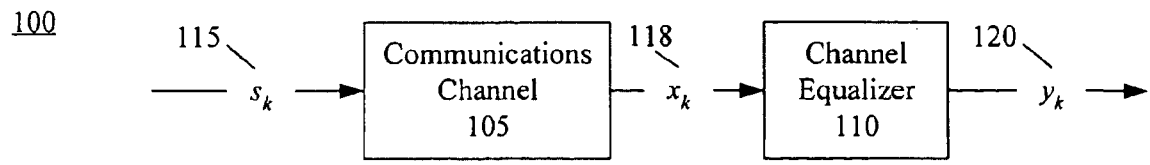
FIG. 1 is a schematic diagram illustrating one embodiment of a system in accordance with the inventive arrangements disclosed herein.

FIG. 1 is a schematic diagram illustrating one embodiment of a system 100 in accordance with the inventive arrangements disclosed herein. As shown, the system 100 can include a communication channel 105 and a channel equalizer 110.

The communication channel 105 can be any network communication channel for digital communications including, but not limited to, wired Local Area Networks (LAN's), Digital Subscriber Line (DSL), cable networks, telephone lines for conventional modems, and the like. It should be appreciated that the inventive arrangements disclosed herein can be applied to both linear and non-linear communication channels. For purposes of illustration only, however, a linear channel has been assumed. Using a complex baseband representation, the communication channel 105 can be represented as:

$$x_k = \sum_{n=0}^{L_h-1} h_n s_{k-n} + e_k \tag{1}$$

where the transmitted symbol sequence $s_k$, or input signal 115, is assumed to take iid complex values from a discrete finite alphabet of symbols referred to as the constellation of the digital modulation. In equation (1), the sequence $h_n$ represents the complex-valued impulse response of the communication channel 105 and $e_k$ represents the additive channel noise for the input signal 115 that is sent through the communication channel 105, resulting in signal $x_k$, or signal 118. The sequence $h_n$, can be represented as infinite impulse response (IIR) as well.

The channel equalizer 110 can be disposed within a receiving device such as a modem, whether a cable modem, a DSL modem, or a conventional telephony modem, or other communication device. As such, it should be appreciated that the channel equalizer 110 can be disposed within a larger information processing system. In any case, an input signal 115 can be transmitted via the communication channel 105. The channel equalizer 110 operates on the received signal 118 to produce an output signal 120 which can be denoted as $y_k$.

The output signal $y_k$ can be represented as follows:

$$y_k = \sum_{n=0}^{L_w-1} w_n x_{k-n} = w^T x \tag{2}$$

where w represents a vector of equalizer coefficients to be adapted by the blind equalization technique to minimize inter-symbol interference (ISI). As a blind equalization technique assumes that no training sequence will be available for adaptation, the blind equalization technique exploits other properties of a received symbol sequence or signal 118.

The proposed approach for blind equalization exploits the fact that the constellation of the transmitted symbol sequence is known. Specifically, the constellation can be modeled as a probability distribution of a number of Dirac-delta functions located at possible symbol values in the constellation. To reduce computational complexity, the symmetry properties of the constellation can be exploited.

In one embodiment, for phase-shift-keying (PSK) and quadrature amplitude modulation (QAM) constellations, the constellation distribution can be defined over the possible complex-magnitude or complex values that the symbols can take rather than the actual complex values. One example is the probability distribution function of the random variable $S^p$ whose samples are given by $|s_i|^p$ where $|.|$ denotes the complex-magnitude of the symbol $s_i$ from the constellation and the superscript $^p$ denotes the $p^{th}$-power. Another example is the probability distribution function of the random variable $S^p$ whose samples are give by the original complex values $s^i$ of a constellation. For purposes of illustration, the probability distribution function of the random variable $S^p$ whose samples are given by $|s_i|^p$ has been used. Still, it should be appreciated that the present invention is not so limited.

The channel equalizer 110 attempts to match the probability distribution of the channel equalizer's 110 output signal 120 to that of the constellation symbols S. This can be achieved by optimizing the divergence between the distributions of these variables. For instance, the quadratic (Euclidean) distance between $f_{y^p}(.)$ and $f_{S^p}(.)$, which is given by $$J(w) = \int_{-\infty}^{\infty} (f_{Y^p}(z) - f_{S^p}(z))^2 dz \tag{3}$$

can be minimized. While the quadratic distance is illustrated herein, it should be appreciated that any of a variety of different algebraic and/or information theoretic distance measures can be used. As such, the use of the quadratic distance should not be construed as a limitation of the present invention.

The probability distributions required for evaluating equation (3), which can be referred to as the Quadratic Distance, can be estimated using Parzen windowing on samples of the output, for example the most recent samples, using equation (4).

$$\hat{f}_{YP}(z) = \frac{1}{L}\sum_{i=0}^{L-1} G_{\sigma_0}(z - |y_{k-i}|^p) \quad (4)$$

In equation (4), $G_\sigma(.)$ represents the kernel function, which typically is a zero-mean probability distribution, with $\sigma$ denoting the size of the kernel function. Notably, if the kernel function is a Gaussian distribution, the kernel size can be controlled by its standard deviation. Similarly, the distribution of $S^p$ can be estimated using the symbols $\{s_1, \ldots, s_{N_s}\}$ in the constellation with equation (5).

$$\hat{f}_{SP}(z) = \frac{1}{N_s}\sum_{i=0}^{N_s-1} G_{\sigma_0}(z - |s_i|^p) \quad (5)$$

Substituting equations (4) and (5) in equation (3), equation (6) below can be obtained.

$$J(w) = \frac{1}{L^2}\sum_{i=0}^{L-1}\sum_{j=0}^{L-1} G_\sigma(|y_{k-j}|^p - |y_{k-i}|^p) + \quad (6)$$
$$\frac{1}{N_s^2}\sum_{i=1}^{N_s}\sum_{j=1}^{N_s} G_\sigma(|s_j|^p - |s_i|^p) -$$
$$\frac{1}{LN_s}\sum_{i=1}^{N_s}\sum_{j=0}^{L-1} G_\sigma(|y_{k-j}|^p - |s_i|^p)$$

The weight vector of the equalizer can be optimized using the following stochastic gradient expression, denoted as equation (7), for minimizing the criterion in equation (6), where p=2 and L=2 for illustration purposes.

$$\nabla_w J(w) = \frac{1}{2}G'_\sigma(|y_k|^2 - |y_{k-1}|^2)(y_k x_k^* - y_{k-1}x_{k-1}^*) - \quad (7)$$
$$\frac{1}{N_s}\sum_{i=1}^{N_s}[G'_\sigma(|y_k|^2 - |s_i|^2)y_k x_k^* +$$
$$G'_\sigma(|y_{k-1}|^2 - |s_i|^2)y_{k-1}x_{k-1}^*]$$

In equation (7), * denotes the element-wise complex-conjugate operation for the input vector x and $G'_\sigma(.)$ denotes the derivative of the kernel function with respect to the argument of the kernel function.

In another embodiment, an alternative algorithm can be obtained by approximating the divergence measure definition such as the one specified in equation (3) with a summation of selected critical points. For a digital communication symbol constellation, the critical points can be selected as the symbol values or the possible symbol-magnitude values. Denoting these critical points with $r_i$ and the desired density value at these points with $T_i$, equation (3) can be simplified to $$J(w) = \frac{1}{N_p}\sum_{i=1}^{N_p}(f_{YP}(r_i) - T_i)^2 \text{ where } T_i = \frac{1}{N_s}\sum_{j=0}^{N_s-1} G_\sigma(r_i - |s_j|^p) \quad (8)$$

and $N_p$ are the number of target points considered, which can be referred to as the Sampled probability density function (PDF) criterion. If $r_i = |s_i|^p$, then $T_i = G_\sigma(0)$. In this latter special case, with p=2, a suitable stochastic gradient can be expressed as equation (9).

$$\nabla_w J(w) = \frac{1}{N_p}\sum_{i=1}^{N_p}[G_\sigma(|y_k|^2 - r_i) - G_\sigma(0)]G'_\sigma(|y_k|^2 - r_i)y_k x_k^* \quad (9)$$

In yet another embodiment, another simplification to equation (3) can be to drop the integral-squared-distribution terms from the expansion of the parenthesis-square in the integral, which are essentially normalization terms. In such an embodiment, a similarity criterion that is the correlation of the probability distributions of the output signal 120 and the original constellation is provided, rather than divergence. Accordingly, the correlation would require maximizing. Such a criterion, which can be referred to as the Matched PDF, can be represented by equation (10).

$$J(w) = \int_{-\infty}^{\infty} f_{YP}(z)f_{SP}(z)dz \quad (10)$$
$$= \frac{1}{LN_s}\sum_{i=1}^{N_s}\sum_{j=0}^{L-1} G_\sigma(|y_{k-j}|^p - |s_i|^p)$$

A stochastic gradient for this criterion where p=2 and L=1 can be expressed as equation (11).

$$\nabla_w J(w) = \frac{1}{N_s}\sum_{i=1}^{N_s} G'_\sigma(|y_k|^2 - |s_i|^2)y_k x_k^* \quad (11)$$

The updates for the weight vector can be in the form of steepest descent/ascent depending on the specific criterion assumed. For example, the weight vector can be represented with equation (12).

$$w_{k+1} = w_k \pm \mu_o \nabla_w J(w_k) \quad (12)$$

In the case of a Gaussian kernel, for example, the kernel size dependent step size, or learning rate, can be selected to be $\mu_o = \mu\sigma^3$, where $0 < \mu << 1$ is a small fixed constant.

The kernel size influences the operation of the channel equalizer. In particular, large kernel values result in a blind-equalization type operation mode, whereas small values yield a decision-directed operation mode. Although the decision-directed mode is capable of achieving a better ISI at its global optimum, it is more susceptible to suboptimal solutions and can get trapped at one such weight vector. Larger kernel sizes have a smoothing effect on the performance surface making the search for the global optimum much easier.

Figure 2:
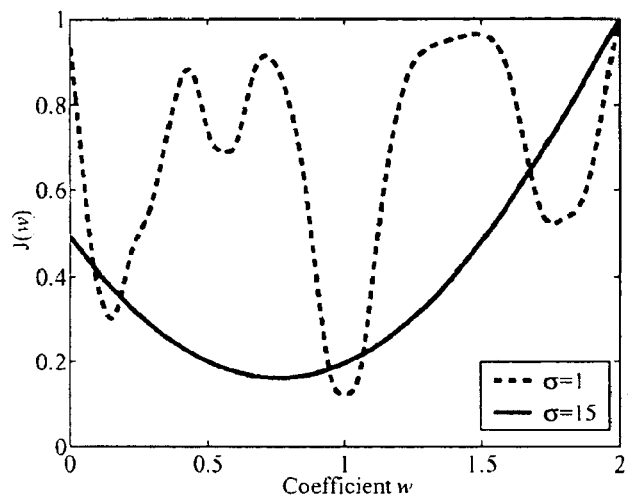
FIG. 2 is a graph illustrating the smoothing effect of kernels in the operation of a channel equalizer in accordance with the inventive arrangements disclosed herein.

FIG. 2 is a graph illustrating the smoothing effect of the kernels in the operation of the channel equalizer in accordance with the inventive arrangements disclosed herein. As shown in FIG. 2, the criterion described in equation (6) has been evaluated for equalizer weight values in the interval of [0,2] in a single-tap equalization scheme for a 16-QAM constellation. The kernel function is a Gaussian distribution with standard deviation $\sigma\sqrt{2}$. In the example shown in FIG. 2, the optimal solution is when the coefficient w=1.

FIG. 2 also demonstrates that the optimal solution obtained when operating in blind mode can be biased from the actual solution that is desired. In order to compensate for this, the constellation point locations can be redefined as scaled versions of the original values of the constellation point locations based on a scaling factor that is a function of the kernel size that is assumed. For example, if p=2 and the complex-magnitudes of the constellation points are used as descriptors of the target probability distribution, a correction factor $F(\sigma)$ must be applied such that $|s_i^c|^2 = F(\sigma)|s_i|^2$.

The modified constellation points then can be utilized in updating the channel equalizer instead of the original values. The function $F(\sigma)$ depends on the criterion and the modulation scheme that is used and must be determined a priori through experimentation. Thus, FIG. 2 depicts the form of this function for the three criteria discussed above in the 16-QAM constellation case with Gaussian kernels.

Figure 3:
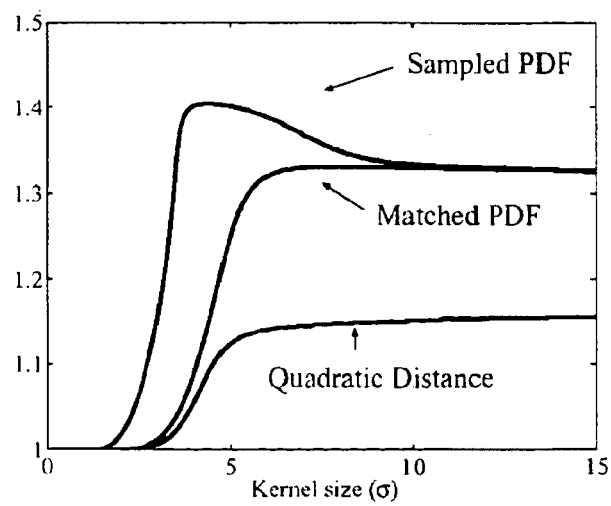
FIG. 3 is a graph illustrating the form of the correction factor function $F(\sigma)$ for three different criteria in accordance with the inventive arrangements disclosed herein.

FIG. 3 is a graph illustrating the form of the correction factor function $F(\sigma)$ for three different criteria in accordance with the inventive arrangements disclosed herein. More particularly, FIG. 3 illustrates $F(\sigma)$ for sampled PDF, matched PDF, and Quadratic distance. As noted, if the kernel size is kept constant at a large value, the channel equalizer will operate in blind mode. Decreasing the kernel size slowly and smoothly, on the other hand, facilitates a smooth transition from blind mode to a decision-directed mode in which much more accurate solutions are attainable.

In order to facilitate automatic switching between the blind mode and the decision-directed mode, the kernel size can be coupled to decision error statistics. For example, in one embodiment, a recursive forgetting estimate of the decision-directed mean-square-error as set forth in equation (13) can be utilized to guide the manipulation of kernel size through iterations.

$$E_{k+1} = \alpha E_k + (1-\alpha) \min_{i=1,\ldots,N_s} \left( (|y_k|^2 - |s_i|^2)^2 \right) \quad (13)$$

In one embodiment, the kernel size can be set to $\sigma_k = aE_k + b$ where a and b are also predetermined constants specific to the constellation. For example, in the 16-QAM case, suitable values for a and b can be 3.5 and −9.5 respectively. In another embodiment, a more general function $\sigma_k = f(E_k, \theta)$ with parameter $\theta$. Notably, in one embodiment, $\theta$ can be replace with parameters a and b. Though the linear relationship $\sigma_k = aE_k + b$ is used in the various examples disclosed herein, it should be appreciated that the linear relationship has been provided as an illustration only. As such, it should not be construed as a limitation of the present invention.

Figure 4:
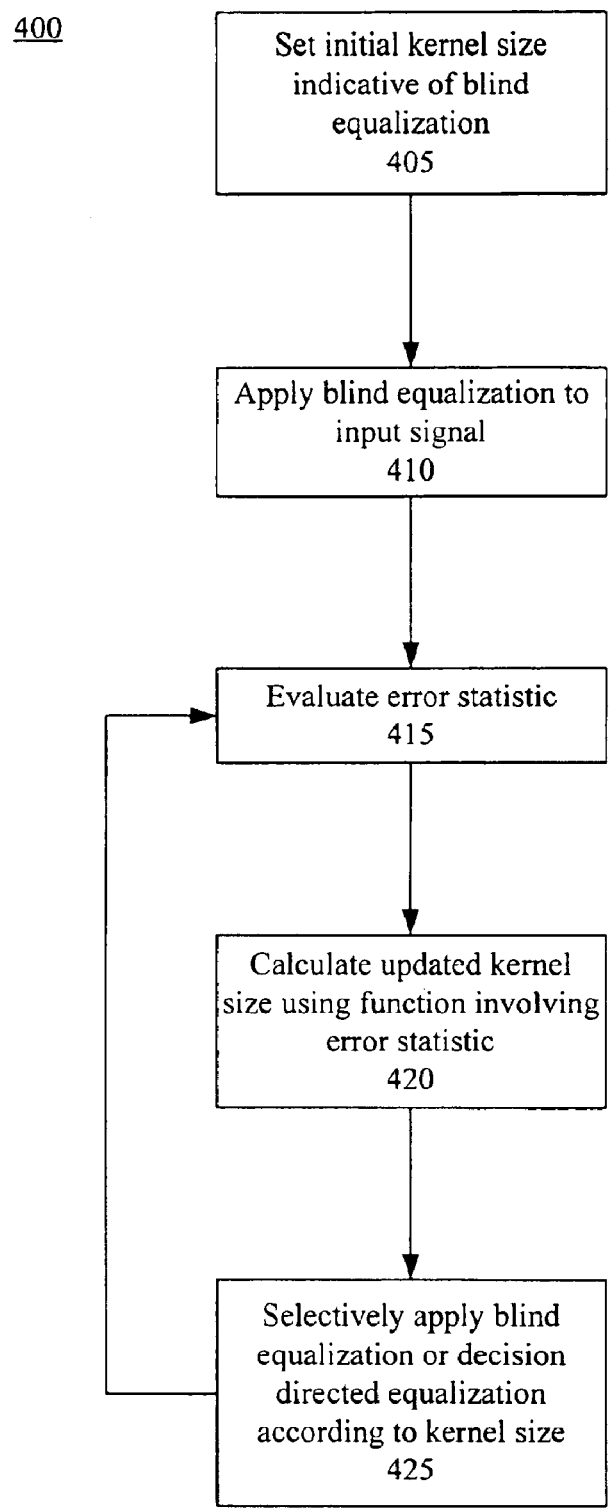
FIG. 4 is a flow chart illustrating a method of selectively applying blind equalization or decision-directed equalization to an input signal in accordance with one embodiment of the present invention.

FIG. 4 is a flow chart illustrating a method 400 of applying blind equalization or decision-directed equalization to an input signal in accordance with one embodiment of the present invention. The method 400 can begin in a state where an input signal is received through a communication channel and equalization is to be applied to the received signal. The method 400 can begin in step 405 where an initial kernel size $\sigma_k$ can be set that is indicative of blind equalization. As noted, larger kernel sizes indicate blind equalization while smaller kernel sizes indicate decision-directed equalization. Notably, step 405 also can include initializing a learning rate $\mu_o$, the error statistic, a forgetting factor $\alpha$, as well as parameters a and b. As noted, parameters a and b are constants that vary according to the type of communication scheme in which the present invention is to be used.

In step 410, blind equalization can be applied to the input signal. Blind or decision-directed equalization can be performed by multiplying the input signal with a vector $w_k$ of equalization coefficients.

In step 415, an error statistic can be evaluated. The error statistic can be a recursive forgetting estimate of the mean-square error. For example, the recursive forgetting estimate of the mean-square error can be denoted as $E_k$ and evaluated according to $$E_{k+1} = \alpha E_k + (1-\alpha) \min_{i=1,\ldots,N_s} \left( (|y_k|^2 - |s_i|^2)^2 \right),$$

where $\alpha$ is the forgetting factor, $y_k$ is the equalized signal, and $s_i$ is derived from a constellation.

In step 420, an updated kernel size can be calculated. The updated kernel size can be a function of the error statistic. The kernel size, denoted as $\sigma_k$, can be calculated according to $\sigma_k = aE_k + b$ or other function as disclosed herein. Notably, the learning rate also can be adjusted.

In step 425, blind equalization or decision-directed equalization can be selectively applied to the input signal according to the updated kernel size. For example, the vector of equalization coefficients $w_k$ can be updated and applied to the input signal. More particularly, $w_k$ can be updated according to $w_{k+1} = w_k \pm \mu_o \nabla_w J(w_k)$, where $J(w_k)$ is the matched probability density function or the sampled probability density function criterion, $\nabla_w$ is the stochastic gradient, and $\mu_o$ is the learning rate modified according to the current value of the kernel size.

The method 400 can repeat as necessary. As the method continues to repeat, the method converges on decision-directed equalization as the error statistic and kernel size continue to decrease. That is, the method 400 begins to automatically apply decision-directed equalization as the error statistic, and also the kernel size, begins to decrease in size.

Figure 5:
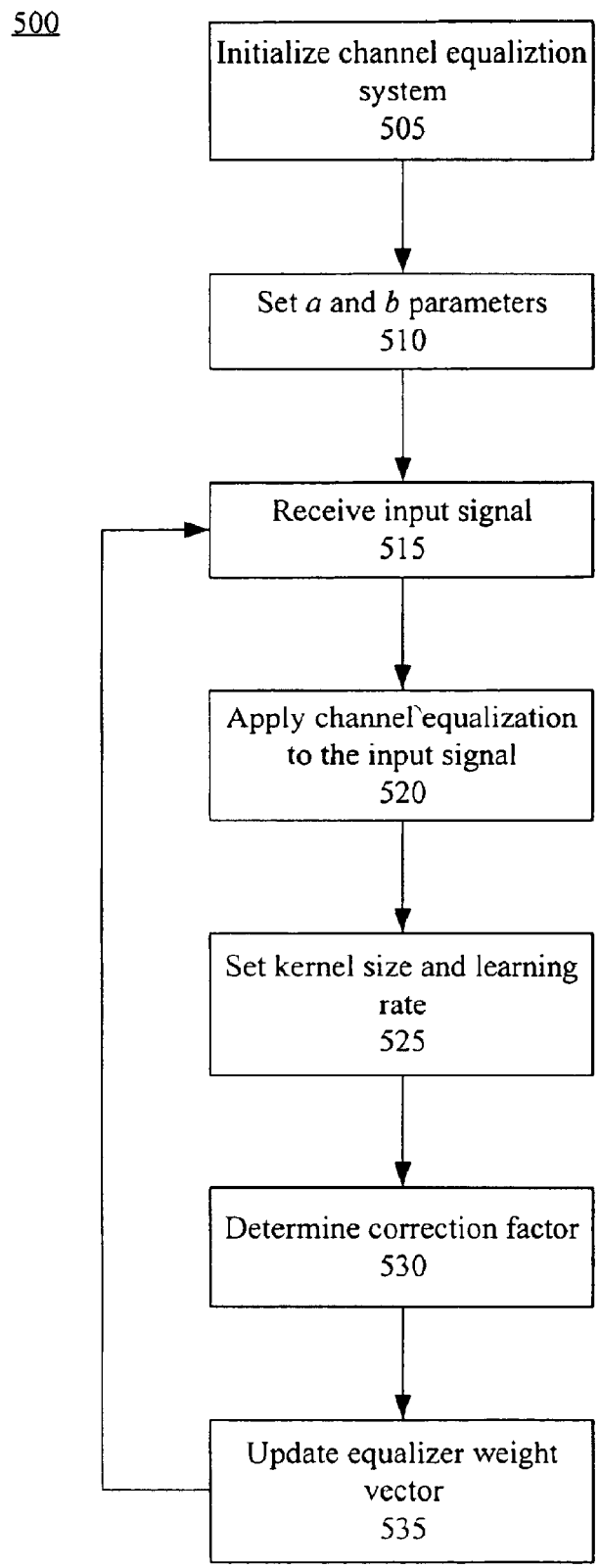
FIG. 5 is a flow chart illustrating a method of selectively applying blind equalization or decision-directed equalization to an input signal in accordance with another embodiment of the present invention.

FIG. 5 is a flow chart illustrating method 500 of selectively applying blind equalization or decision-directed equalization to an input signal in accordance with another embodiment of the present invention. The method 500 can begin in a state where an input signal is received through a communication channel and equalization is to be applied to the received signal. In step 505, the channel equalizer can be initialized. More particularly, the channel equalizer coefficients $w_k$, the learning rate $\mu_o$, the error estimation rate $E_k$ and the forgetting factor $\alpha$ can be set to initial values. In step 510, the parameter $\theta$, or in another embodiment parameters a and b, can be initialized.

In step 515, an input signal $x_k$ can be received. In step 520, channel equalization can be applied to the received input signal. That is, an output signal $y_k$ can be calculated as $y_k = w_k x_k$.

In step 525, the kernel size and the learning rate can be determined. The kernel size can be set or updated using the formula $\sigma_k = f(E_k, \theta)$ or $\sigma_k = aE_k + b$, where $\theta$, a, and b are constants as noted and $E_k$ is the error estimation from the previous (or initial) iteration. The error learning rate can be set to $\mu_o = \mu \sigma^3$, where $0 < \mu << 1$ is a small fixed constant. In another embodiment, however, $\mu$ can be allowed to vary in time.

In step 530, the correction factor $F(\sigma)$ can be determined. As the function $F(\sigma)$ is calculated a priori, the correction factor can be determined from a lookup table or other data structure storing such values in memory. In step 535, the equalizer weight can be updated as follows: $w_{k+1} = w_k \pm \mu_o \nabla_w J(w_k)$. The method 500 can repeat as necessary. As the method 500 continues to iterate, the equalization applied to the input signal moves from blind to decision-directed. As noted, method 500 begins to automatically apply decision-directed equalization as the error statistic, and also the kernel size, begins to decrease in size.

The present invention provides an equalization solution that does not require training data and, in consequence, utilizes less bandwidth than supervised equalizers. The inventive arrangements disclosed herein converge upon a solution using fewer samples, i.e. approximately 2,000–3,000 samples, thereby attaining increased data efficiency. Further, the present invention provides automatic switching to decision directed equalization. The aforementioned attributes of the inventive arrangements disclosed herein are provided without adding computational cost.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An iterative method of equalizing an input signal received over a digital communication channel, said method comprising:
    (a) using a kernel density estimate where different values of a kernel size are indicative of either a blind or a decision-directed equalization mode;
    (b) processing a received signal using a blind equalization mode;
    (c) evaluating, on a block or sample basis, an error measure based on a distance among a distribution of an equalizer output and a constellation;
    (d) updating the kernel size based upon the error measure thereby facilitating automatic switching between the blind and decision-directed equalization modes, where the kernel size is initially set to a value indicative of the blind equalization mode; and
    (e) selectively applying blind equalization or decision-directed equalization to the input signal according to the updated kernel size for subsequent iterations of steps (c)–(e).

2. The method of claim 1, wherein the error measure is an estimate of a density distance.

3. The method of claim 2, wherein the density distance is calculated according to $$\hat{f}_{Y^p}(z) = \frac{1}{L}\sum_{i=0}^{L-1} G_{\sigma_0}(z-|y_{k-i}|^p) \text{ or}$$

$$\hat{f}_{S^p}(z) = \frac{1}{N_s}\sum_{i=0}^{N_s-1} G_{\sigma_0}(z-|s_i|^p),$$

where $\hat{f}_{Y^p}$ and $\hat{f}_{S^p}$ are, respectively, an estimated equalizer output probability density and source constellation probability density; L is a window length corresponding to the number of recent output samples; $N_S$ is a number of points in a constellation; $G_{\sigma_0}$ is a kernel function for kernel bandwidth $\sigma_0$; $y_{k-i}$ a complex-valued equalizer output at time index k–i; $s_i$ is an $i^{th}$ symbol in the constellation; and where $|.|$ denotes the $p^{th}$ power of the complex magnitude of its argument.

4. The method of claim 3, wherein the error measure is a recursive forgetting estimate of the mean-square error.

5. The method of claim 4, wherein the recursive forgetting estimate of the mean-square error is denoted as $E_k$ and is evaluated according to $$E_{k+1} = \alpha E_k + (1-\alpha)\min_{i=1,\ldots,N_s}(Y_k^2 - S_i^2)^2,$$

where $\alpha$ is a forgetting factor, $y_k$ is the equalized signal, and $s_i$ is derived from a constellation.

6. The method of claim 1, said step (a) further comprising initializing a learning rate, the error measure, a forgetting factor, and at least one constant for updating the kernel size.

7. The method of claim 6, further comprising adjusting the learning rate.

8. The method of claim 1, wherein the kernel size is denoted as $\sigma_k$ and is calculated according to $\sigma_k = f(E_k, \theta)$, wherein $f$ is a function with predetermined constant parameter $\theta$ and $E_k$ is the error measure.

9. The method of claim 8, wherein $\theta$ is comprised of predetermined constant parameters a and b.

10. The method of claim 1, wherein blind or decision-directed equalization is performed by multiplying the input signal with a vector of equalization coefficients.

11. The method of claim 10, said step (e) further comprising updating the vector of equalization coefficients.

12. The method of claim 11, wherein the vector of equalization coefficients is denoted as $w_k$ and is updated according to $w_{k+1} = w_k \pm \mu_o \nabla_w J(w_k)$, where $J(w_k)$ is the matched power density function or the sampled power density function criterion, $\nabla_w$ is the stochastic gradient, and $\mu_o$ is the learning rate.

13. A system for performing an iterative method of equalizing an input signal received over a digital communication channel, said system comprising:
    (a) means for using a kernel density estimate where different values of a kernel size are indicative of either a blind or a decision-directed equalization mode;
    (b) means for processing a received signal using a blind equalization mode;
    (c) means for evaluating, on a block or sample basis, an error measure based on a distance among a distribution of an equalizer output and a constellation;
    (d) means for updating the kernel size based upon the error measure thereby facilitating automatic switching between the blind and decision-directed equalization modes, where the kernel size is initially set to a value indicative of the blind equalization mode; and
    (e) means for selectively applying blind equalization or decision-directed equalization to the input signal according to the updated kernel size for subsequent operations of means (c)–(e).

14. The system of claim 13, wherein the error measure is an estimate of a density distance.

15. The system of claim 14, wherein the density distance is calculated according to $$\hat{f}_{Y^p}(z) = \frac{1}{L}\sum_{i=0}^{L-1} G_{\sigma_0}(z-|y_{k-i}|^p) \text{ or}$$

$$\hat{f}_{S^p}(z) = \frac{1}{N_s}\sum_{i=0}^{N_s-1} G_{\sigma_0}(z-|s_i|^p),$$

where $\hat{f}_{Y^p}$ and $\hat{f}_{S^p}$ are, respectively, an estimated equalizer output probability density and source constellation probability density; L is a window length corresponding to the number of recent output samples; $N_S$ is a number of points in a constellation; $G_{\sigma_0}$ is a kernel function for kernel bandwidth $\sigma_0$; $y_{k-i}$ is a complex-valued equalizer output at time index k−i; $s_i$ is an $i^{th}$ symbol in the constellation; and where |.| denotes the $p^{th}$ power of the complex magnitude of its argument.

16. The system of claim 15, wherein the error measure is a recursive forgetting estimate of the mean-square error.

17. The system of claim 16, wherein the recursive forgetting estimate of the mean-square error is denoted as $E_k$ and is evaluated according to $$E_{k+1} = \alpha E_k + (1-\alpha) \min_{i=1,\ldots,N_s} (Y_k^2 - S_i^2)^2,$$

where $\alpha$ is a forgetting factor, $y_k$ is the equalized signal, and $s_i$ is derived from a constellation.

18. The system of claim 13, said means (a) further comprising means for initializing a learning rate, the error statistic, a forgetting factor, and at least one constant for updating the kernel size.

19. The system of claim 18, further comprising means for adjusting the learning rate.

20. The system of claim 13, wherein the kernel size is denoted as $\sigma_k$ and is calculated according to $\sigma_k = f(E_k, \theta)$, wherein $f$ is a function with predetermined constant parameter $\theta$ and $E_k$ is the error statistic.

21. The system of claim 20, wherein $\theta$ is comprised of predetermined constant parameters a and b.

22. The system of claim 13, wherein blind or decision-directed equalization is performed by multiplying the input signal with a vector of equalization coefficients.

23. The system of claim 22, said means (e) further comprising means for updating the vector of equalization coefficients.

24. The system of claim 23, wherein the vector of equalization coefficients is denoted as $w_k$ and is updated according to $w_{k+1} = w_k \pm \mu_\sigma \nabla_w J(w_k)$, where $J(w_k)$ is the matched power density function or the sampled power density function criterion, $\nabla_w$ is the stochastic gradient, and $\mu_\sigma$ is the learning rate.

25. A machine-readable storage having stored thereon, a computer program having a plurality of code sections, said code sections executable by a machine for causing the machine to perform an iterative method of equalizing an input signal received over a digital communication channel, said method comprising the steps of:
(a) using a kernel density estimate where different values of a kernel size are indicative of either a blind or a decision-directed equalization mode;
(b) processing a received signal using a blind equalization mode;
(c) evaluating, on a block or sample basis, an error measure based on a distance among a distribution of an equalizer output and a constellation;
(d) updating the kernel size based upon the error measure thereby facilitating automatic switching between the blind and decision-directed equalization modes, where the kernel size is initially set to a value indicative of the blind equalization mode; and
(e) selectively applying blind equalization or decision-directed equalization to the input signal according to the updated kernel size for subsequent iterations of steps (c)–(e).

26. The machine-readable storage of claim 25, wherein the error measure is an estimate of a density distance.

27. The machine-readable storage of claim 26, wherein the density distance is calculated according to $$\hat{f}_{Y^p}(z) = \frac{1}{L} \sum_{i=0}^{L-1} G_{\sigma_0}(z - |y_{k-i}|^p) \text{ or}$$

$$\hat{f}_{S^p}(z) = \frac{1}{N_s} \sum_{i=0}^{N_s-1} G_{\sigma_0}(z - |s_i|^p),$$

where $\hat{f}_{Y^p}$ and $\hat{f}_{S^p}$ are, respectively, an estimated equalizer output probability density and source constellation probability density; L is a window length corresponding to the number of recent output samples; $N_S$ is a number of points in a constellation; $G_{\sigma_0}$ is a kernel function for kernel bandwidth $\sigma_0$; $y_{k-i}$ is a complex-valued equalizer output at time index k−i; $s_i$ is an $i^{th}$ symbol in the constellation; and where |.| denotes the $p^{th}$ power of the complex magnitude of its argument.

28. The machine-readable storage of claim 27, wherein the error measure is a recursive forgetting estimate of the mean-square error.

29. The machine-readable storage of claim 28, wherein the recursive forgetting estimate of the mean-square error is denoted as $E_k$ and is evaluated according to $$E_{k+1} = \alpha E_k + (1-\alpha) \min_{i=1,\ldots,N_s} (Y_k^2 - S_i^2)^2,$$

where $\alpha$ is a forgetting factor, $y_k$ is the equalized signal, and $s_i$ is derived from a constellation.

30. The machine-readable storage of claim 25, said step (a) further comprising initializing a learning rate, the error statistic, a forgetting factor, and at least one constant for updating the kernel size.

31. The machine-readable storage of claim 30, further comprising adjusting the learning rate.

32. The machine-readable storage of claim 25, wherein the kernel size is denoted as $\sigma_k$ and is calculated according to $\sigma_k = f(E_k, \theta)$, wherein $f$ is a function with predetermined constant parameter $\theta$ and $E_k$ is the error measure.

33. The machine readable storage of claim 32, wherein $\theta$ is comprised of predetermined constant parameters a and b.

34. The machine-readable storage of claim 25, wherein blind or decision-directed equalization is performed by multiplying the input signal with a vector of equalization coefficients.

35. The machine-readable storage of claim 34, said step (e) further comprising updating the vector of equalization coefficients.

36. The machine-readable storage of claim 35, wherein the vector of equalization coefficients is denoted as $w_k$ and is updated according to $w_{k+1} = w_k \pm \mu_\sigma \nabla_w J(w_k)$, where $J(w_k)$ is the matched power density function or the sampled power density function criterion, $\nabla_w$ is the stochastic gradient, and $\mu_\sigma$ is the learning rate.

* * * * *